United States Patent
Chuang et al.

(10) Patent No.: US 10,252,215 B2
(45) Date of Patent: Apr. 9, 2019

(54) COMPOSITION AND APPARATUS FOR PURIFYING NITROGEN-OXIDE-CONTAINING GASES

(71) Applicant: INDUSTRIAL TECHNOLOGY RESEARCH INSTITUTE, Hsinchu (TW)

(72) Inventors: Kai-Hsiang Chuang, Changhua (TW); Kuo-Chuang Chiu, Hsinchu (TW); Kuan-Yi Li, New Taipei (TW)

(73) Assignee: Industrial Technology Research Institute, Hsinchu (TW)

(*) Notice: Subject to any disclaimer, the term of this patent is extended or adjusted under 35 U.S.C. 154(b) by 69 days.

(21) Appl. No.: 15/461,765

(22) Filed: Mar. 17, 2017

(65) Prior Publication Data
US 2018/0104643 A1 Apr. 19, 2018

(30) Foreign Application Priority Data
Oct. 14, 2016 (TW) .............................. 105133185 A

(51) Int. Cl.
*B01D 53/94* (2006.01)
*B01D 53/56* (2006.01)
(Continued)

(52) U.S. Cl.
CPC ......... *B01D 53/1493* (2013.01); *B01D 53/18* (2013.01); *B01D 53/56* (2013.01); *B01D 53/75* (2013.01); *B01D 53/78* (2013.01); *B01D 53/864* (2013.01); *B01D 53/8631* (2013.01); *B01D 53/92* (2013.01); *B01D 53/9431* (2013.01); *B01J 23/10* (2013.01); *B01J 35/04* (2013.01);
(Continued)

(58) Field of Classification Search
None
See application file for complete search history.

(56) References Cited

U.S. PATENT DOCUMENTS

| 882,180 A | 3/1908 | Taylor et al. |
| 4,670,234 A * | 6/1987 | Holter ............... B01D 53/60 423/235 |

(Continued)

FOREIGN PATENT DOCUMENTS

| CN | 1907548 A * | 2/2007 |
| CN | 104428249 A | 3/2015 |

(Continued)

OTHER PUBLICATIONS

Shi, M.—(CN1907548A)—translated document (Year: 2007).*
(Continued)

*Primary Examiner* — Walter D. Griffin
*Assistant Examiner* — Jelitza M Perez
(74) *Attorney, Agent, or Firm* — Birch, Stewart, Kolasch & Birch, LLP

(57) ABSTRACT

A composition and a device for purification of nitrogen-oxide-containing gas is provided. It can purify harmful nitrogen-oxide-containing gases, such as nitric oxide or nitrogen dioxide. The composition includes an alkaline substance and at least one organic acid, the organic acids having an enediol group, enediamine group, or amine group of cyclopentane compounds, cyclohexane compounds, cycloheptane compounds, or phenanthrene compounds.

8 Claims, 1 Drawing Sheet

(51) Int. Cl.
*B01D 53/14* (2006.01)
*B01D 53/18* (2006.01)
*B01D 53/78* (2006.01)
*B01D 53/86* (2006.01)
*B01D 53/92* (2006.01)
*B01J 23/10* (2006.01)
*B01J 35/04* (2006.01)
*B01D 53/75* (2006.01)

(52) U.S. Cl.
CPC .............. *B01D 2252/205* (2013.01); *B01D 2252/2023* (2013.01); *B01D 2252/2041* (2013.01); *B01D 2252/20494* (2013.01); *B01D 2252/502* (2013.01); *B01D 2252/60* (2013.01); *B01D 2255/2063* (2013.01); *B01D 2255/2065* (2013.01); *B01D 2258/01* (2013.01); *B01D 2258/0283* (2013.01)

(56) References Cited

U.S. PATENT DOCUMENTS

| | | | |
|---|---|---|---|
| 4,731,233 A * | 3/1988 | Thompson | B01D 53/60 423/239.1 |
| 7,560,076 B2 | 7/2009 | Rounbehler et al. | |
| 7,618,594 B2 | 11/2009 | Rounbehler et al. | |
| 7,947,227 B2 | 5/2011 | Fine et al. | |
| 8,057,742 B2 | 11/2011 | Rounbehler et al. | |
| 8,083,997 B2 | 12/2011 | Rounbehler et al. | |
| 8,173,072 B2 | 5/2012 | Fine et al. | |
| 8,211,368 B2 | 7/2012 | Fine et al. | |
| 8,226,916 B2 | 7/2012 | Rounbehler et al. | |
| 8,242,324 B2 | 8/2012 | Johnson | |
| 8,246,725 B2 | 8/2012 | Rounbehler et al. | |
| 8,609,028 B2 | 12/2013 | Rounbehler et al. | |
| 8,715,577 B2 | 5/2014 | Fine et al. | |
| 9,108,187 B2 | 8/2015 | Ogura et al. | |
| 2010/0104667 A1 | 4/2010 | Fine et al. | |
| 2010/0150786 A1 | 6/2010 | Rounbehler et al. | |
| 2011/0240020 A1 | 10/2011 | Fine et al. | |
| 2012/0085457 A1 | 4/2012 | Rounbehler et al. | |
| 2012/0125328 A1 | 5/2012 | Rounbehler et al. | |
| 2012/0251399 A1 | 10/2012 | Fine et al. | |
| 2013/0017277 A1 | 1/2013 | Rounbehler et al. | |
| 2013/0037023 A1 | 2/2013 | Rounbehler et al. | |
| 2014/0102448 A1 | 4/2014 | Rounbehler et al. | |
| 2014/0157987 A1 | 6/2014 | Ogura et al. | |
| 2015/0007814 A1 | 1/2015 | Fine et al. | |
| 2015/0166356 A1 | 6/2015 | Ogura et al. | |
| 2015/0182941 A1 | 7/2015 | Ogura et al. | |
| 2015/0202401 A1 | 7/2015 | Rounbehler et al. | |
| 2015/0246345 A1 | 9/2015 | Collier et al. | |

FOREIGN PATENT DOCUMENTS

| | | |
|---|---|---|
| CN | 104906931 A | 9/2015 |
| TW | 333468 | 6/1998 |
| TW | 201542284 A | 11/2015 |

OTHER PUBLICATIONS

Taiwanese Office Action and Search Report, dated Jul. 25, 2017, for Taiwanese Application No. 105133185.

Chen Hua Shen, "Nitrogen Dioxide Absorption in Aqueous Sodium Sulfite", The University of Texas at Austin, 1997, 202 pages.

Ching-yi Wu et al., "Reduction of nitrogen dioxide from etching vent gases by scrubbing with caustic sodium sulfide solution", Journal of Chemical Technology and Biotechnology, 2014, vol. 89, pp. 1850-1858.

E. Sada et al., "Absorption of NO in Aqueous Solutions of KMnO4", Chemical Engineering Science, 1977, vol. 32, pp. 1171-1175.

J.C. Chen, "The De-Nox Applications of China Steel SCR catalyst in the power plant and sintering plant", Journal of the Chinese Institute of Engineers—Kaohsiung, 2014, vol. 22, 10 pages.

Józef Kuropka, "Removal of Nitrogen Oxides from Flue Gases in a Packed Column", Environment Protection Engineering, 2011, vol. 37, pp. 13-22.

Luke Chen et al., "Absorption of NO2 in a Packed Tower with Na2SO3 Aqueous Solution", Environmental Progress, 2002, vol. 21 pp. 225-230.

Robert Richardson Ph.D., "NOx Scrubbing Technology Breakthrough", National Association for Surface Finishing, 2014, vol. 78, pp. 1-7.

\* cited by examiner

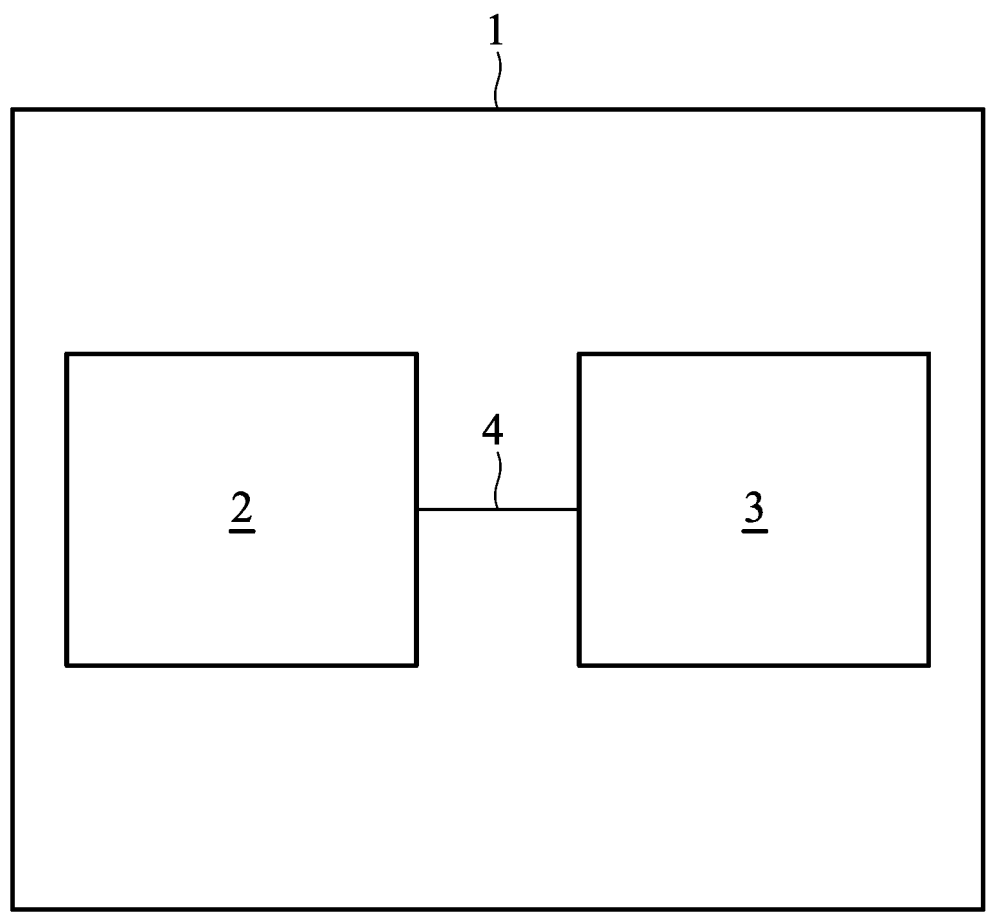

COMPOSITION AND APPARATUS FOR PURIFYING NITROGEN-OXIDE-CONTAINING GASES

CROSS REFERENCE TO RELATED APPLICATIONS

The present application is based on, and claims priority from, Taiwan Application Serial Number 105133185, filed on Oct. 14, 2016, the disclosure of which is hereby incorporated by reference herein in its entirety.

TECHNICAL FIELD

The technical field relates to a composition and a device for purifying nitrogen-oxide-containing gases.

BACKGROUND

Nitrogen-oxide-containing gases exist in exhaust from diesel vehicles, pickling factories, coal-fired power stations etc. These gases are harmful to human health and also are the main culprit of acid rain. These harmful gases are known in the industry as yellow smoke.

Nowadays, a popular technology for denitration is catalyst denitration, which includes selective non-catalytic reduction (SNCR), selective catalytic reduction (SCR), and scrubber methods. The scrubber method has one of the lowest costs, and has a market utilization rate of up to 90%. However, due to the limitation of the effect for treatment of scrubber method, nitrogen-oxide-containing gases are still present in treated effluents.

In addition to the methods listed above, an electrochemical method can be used in denitration. The mechanism is the reaction between nitrogen-oxide-containing gases and ammonia or urea. However, the electrochemical process produces ammonium nitrate-containing wastewater, which is explosive.

Accordingly, an innovative composition for purifying nitrogen-oxide-containing gases is called for.

SUMMARY

One embodiment of the disclosure provides a composition for purifying nitrogen-oxide-containing gases. The nitrogen-oxide-containing gases can be purified by the composition. For example, the nitrogen-oxide-containing gases pass through the composition of the present disclosure to produce nitrogen ($N_2$) gas or another environmentally friendly substance, thereby reducing environmental pollution and lowering the risk of human health factors. The composition comprises an alkaline substance and at least one organic acid having a group which can be chelated with nitrogen-oxide-containing substances.

Another embodiment of the disclosure provides a device for purification of nitrogen-oxide-containing gases. The device performs the function of producing nitrogen dioxide from nitrogen-oxide-containing gases, and purifies nitrogen-oxide-containing gases.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1 is a configuration view of a device according to an embodiment of the disclosure.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

One embodiment of the disclosure provides a composition for purifying nitrogen-oxide-containing gases, which includes an alkaline substance which adjusts the pH, and at least one organic acid that serves as a reductant to reduce the nitrogen-oxide-containing substances. Therefore, the harmful nitrogen-oxide-containing gases, for example NO or $NO_2$, can be purified with excellent purifying results.

According to the present disclosure, the organic acid comprises a cyclopentane compound having an enediol group

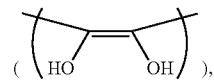

enediamine group

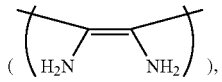

or amide group

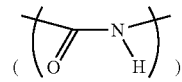

a cyclohexane compound having an enediol group, enediamine group, or amide group, a cycloheptane compound having an enediol group, enediamine group, or amide group, a fused ring compound having an enediol group, enediamine group, or amide group or a phenanthrene compound having an enediol group, enediamine group, or amide group.

According to the present disclosure, the alkaline substances are sodium hydroxide, potassium hydroxide, or calcium hydroxide etc. which are used to adjust a composition to have a pH of 5-14.

In one embodiment of the disclosure, the alkaline substances are sodium hydroxide, potassium hydroxide, or calcium hydroxide etc, and the organic acid comprises a cyclopentane compound having an enediol group

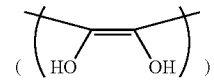

a cyclohexane compound having an enediol group, a cycloheptane compound having an enediol group, a fused ring compound having an enediol group or a phenanthrene compound having an enediol group.

Another embodiment of the disclosure includes alkaline substances that are sodium hydroxide, potassium hydroxide, or calcium hydroxide etc, and the organic acid comprises a cyclopentane compound having an enediamine group

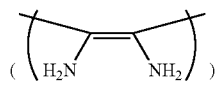

a cyclohexane compound having an enediamine group, a cycloheptane compound having an enediamine group, a fused ring compound having an enediamine group or a phenanthrene compound having an enediamine group, for example having an ortho-diaminobenzoic group.

In an alternative embodiment of the disclosure, the alkaline substances are sodium hydroxide, potassium hydroxide, or calcium hydroxide etc, and the organic acid comprises a cyclopentane compound having an amide group

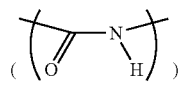

a cyclohexane compound having an amide group, a cycloheptane compound having an amide group, a fused ring compound having an amide group or a phenanthrene compound having an amide group.

According to the present disclosure, the organic acids are croconic acid, gallic acid, ascorbic acid, 3,4-Diaminobenzoic acid, ubiquinone, anthocyanidin, catechin, β-carotene, lycopene, 1,2-dihydroxy-3-one cyclopentene, hydroxymalonaldehyde, uric acid or 2,6-di-tert-butyl-p-cresol (BHT) etc.

In one embodiment, the alkali substance which is used to adjust the composition solution has a concentration of 0.01-3.0M.

According to the present disclosure, the organic acid has a concentration of 0.01-3.0M.

In one embodiment of the disclosure, the solution of the composition for purifying nitrogen-oxide-containing gases has an oxidation-reduction potential (ORP) of −600-40 mv, for example.

Referring to FIG. 1, according to another embodiment of the disclosure, a device for purification of nitrogen-oxide-containing gases is provided. The device 1 includes a conversion module 2 and a purification tank 3, wherein the conversion module is for converting nitric oxide to nitrogen dioxide, and starts as needed. The purification tank serves as a reservoir for the aforementioned composition to purify the harmful or pollution-causing nitrogen-oxide-containing gases. In addition, the device 1 further comprises a connecting element 4, and the purified gas passes through the connecting element 4 into the purification tank.

In one embodiment of the disclosure, the conversion module 2 may contain a palladium (Pd)-based oxide, a platinum (Pt)-based oxide, a rhodium (Rh)-based oxide, a lanthanum (La)-based oxide, or a combination thereof.

Experimental Method and Purifying Ratio of Calculation for Purifying Nitrogen-Oxide-Containing Gases Production of Nitrogen-Oxide-Containing Gases (Simulating the Exhaust Gases in the Environment)

Nitrogen ($N_2$), oxygen ($O_2$), and nitrogen dioxide ($NO_2$) were mixed at a constant rate by means of a mass flow controller (MFC) and then passed into an oxidizing catalytic reactor at a constant temperature to produce nitrogen-oxide-containing gases, and converting most of the nitric oxide gas into nitrogen dioxide gas to simulate the composition of yellow smoke in industrial exhaust gases. The composition of the nitric oxide and nitrogen dioxide gas (where the nitrogen oxides contained nitric oxide and nitrogen dioxide) was analyzed and recorded by a gas analyzer (Horiba MEXA-584L).

The aforementioned simulation gas was passed through a gas-purifying washing bottle containing the composition used for purifying nitrogen-oxide-containing gas disclosed in the present disclosure, and the gas composition after purification and washing was analyzed with a nitrogen-oxide-containing gas detector (Horiba MEXA-584L).

Purifying ratio formula for purifying nitrogen-oxide-containing gases formula I $$\text{Purifying ratio (\%)} = \frac{\text{Amount of nitrogen-oxide containing gas before purifying} - \text{Amount of nitrogen-oxide containing gas after purifying}}{\text{Amount of nitrogen-oxide containing gas before purifying}} \times 100\%$$

EXAMPLES

Converting Nitric Oxide to Nitrogen Dioxide

Preparation of Oxidizing Catalyst

The honeycomb-shaped cordierite carrier was coated with 10 g mixed powder of 50 wt % lanthanum oxide-50 wt % cerium oxide mixture and was sintered in a high-temperature furnace at 400-1000° C. The mixed powder was fixed in a cordierite carrier to complete the oxidizing catalyst production. The oxidizing catalyst was formed.

Gas Conversion Experiment (Nitric Oxide Convert to Nitrogen Dioxide)

Example 1

The oxidizing catalyst was placed in a tubular furnace and a fixed ratio of nitrogen, oxygen and nitric oxide was introduced at 300° C. The nitric oxide, either before or after the oxidizing catalyst was passed through, was converted into nitrogen dioxide. The amount of nitrogen-oxide-containing gas before and after the conversion was measured with a gas analyzer (Horiba MEXA-584L) until the gas concentration was stabilized to complete the reaction. The amount of nitrogen oxides before and after the conversion were measured with a gas analyzer (Horiba MEXA-584L) until the gas concentrations were stabilized. Then the reaction was completed.

Preparation of the Composition for Purifying Nitrogen-Oxide-Containing Gases

Example 2

An aqueous solution of 0.2 M ascorbic acid ($C_6H_8O_6$) and 0.2 M sodium hydroxide (NaOH) was prepared as a cleaning agent for purifying nitrogen-oxide-containing gases. The pH of the aqueous solution was 5.6 and the oxidation-reduction potential (ORP) was −107 mV with pH meter (Clean Instruments, PH200) and ORP analyzer (Clean Instruments, PH200) individually. Next, the nitrogen-oxide-containing gases passed through the cleaning agent and were analyzed with a gas detector. The nitrogen-oxide-containing gases purifying rate was calculated to be 81%, and the purification rate of nitrogen dioxide was 99%, calculated using formula I.

Example 3

An aqueous solution of 0.2 M ascorbic acid ($C_6H_8O_6$) and 0.4 M sodium hydroxide (NaOH) was prepared as a cleaning agent for purifying nitrogen-oxide-containing gases. The pH of the aqueous solution was 12.2 and the oxidation-reduction potential (ORP) was −516 mV with pH meter and ORP analyzer individually. Next, the nitrogen-oxide-containing gases were passed through the cleaning agent and analyzed with a gas detector. The nitrogen-oxide-containing gases purifying rate was calculated to be 87%, and the purification rate of nitrogen dioxide was 99%, calculated using formula I.

Example 4

An aqueous solution of 0.01 M ascorbic acid ($C_6H_8O_6$) and 0.04 M sodium hydroxide (NaOH) was prepared as a cleaning agent for purifying nitrogen-oxide-containing gases. The pH of the aqueous solution was 12.3 and the oxidation-reduction potential (ORP) was −400 mV with pH meter and ORP analyzer. Next, the nitrogen-oxide-containing gases were passed through the cleaning agent and analyzed with a gas detector. The purification rate of nitrogen dioxide was 100%, calculated using formula I.

Example 5

An aqueous solution of 3 M ascorbic acid ($C_6H_8O_6$) and 3 M sodium hydroxide (NaOH) was prepared as a cleaning agent for purifying nitrogen-oxide-containing gases. The pH of the aqueous solution was 5.9 and the oxidation-reduction potential (ORP) was −509 mV. Next, the nitrogen-oxide-containing gases were passed through the cleaning agent and analyzed with a gas detector. The purification rate of nitrogen dioxide was 100%, calculated using formula I.

Example 6

An aqueous solution of 0.2 M gallic acid ($C_7H_6O_5$) and 0.2 M sodium hydroxide (NaOH) was prepared as a cleaning agent for purifying nitrogen-oxide-containing gases. The pH of the aqueous solution was 8.8 and the oxidation-reduction potential (ORP) was −156 mV with pH meter and ORP analyzer individually. Next, the nitrogen-oxide-containing gases were passed through the cleaning agent and analyzed with a gas detector. The nitrogen-oxide-containing gases purifying rate was calculated to be 84%, and the purification rate of nitrogen dioxide was 98%, calculated using formula I.

Example 7

An aqueous solution of 0.2 M gallic acid ($C_7H_6O_5$) and 0.4 M sodium hydroxide (NaOH) was prepared as a cleaning agent for purifying nitrogen-oxide-containing gases. The pH of the aqueous solution was 10.7 and the oxidation-reduction potential (ORP) was −215 mV with pH meter and ORP analyzer individually. Next, the nitrogen-oxide-containing gases were passed through the cleaning agent and analyzed with a gas detector. The nitrogen-oxide-containing gases purifying rate was calculated to be 86%, and the purification rate of nitrogen dioxide was 99%, calculated using formula I.

Example 8

An aqueous solution of 0.015 M croconic acid ($C_5H_2O_5$) and 0.2 M sodium hydroxide (NaOH) was prepared as a cleaning agent for purifying nitrogen-oxide-containing gases. The pH of the aqueous solution was 13.1 and the oxidation-reduction potential (ORP) was −160 mV with pH meter and ORP analyzer individually. Next, the nitrogen-oxide-containing gases were passed through the cleaning agent and analyzed with a gas detector. The purification rate of nitrogen dioxide was 88%, calculated using formula I.

Example 9

An aqueous solution of 0.015 M croconic acid ($C_5H_2O_5$) and 0.4 M sodium hydroxide (NaOH) was prepared as a cleaning agent for purifying nitrogen-oxide-containing gases. The pH of the aqueous solution was 13.4 and the oxidation-reduction potential (ORP) was −220 mV with pH meter and ORP analyzer individually. Next, the nitrogen-oxide-containing gases were passed through the cleaning agent and analyzed with a gas detector. The purification rate of nitrogen dioxide was 91%, calculated using formula I.

Example 10

An aqueous solution of 0.2 M 5-aminouracil and 0.2 M sodium hydroxide (NaOH) was prepared as a cleaning agent for purifying nitrogen-oxide-containing gases. The pH of the aqueous solution was 11.0 and the oxidation-reduction potential (ORP) was −161 mV with pH meter and ORP analyzer individually. Next, the nitrogen-oxide-containing gases were passed through the cleaning agent and analyzed with a gas detector. The purification rate of nitrogen dioxide was 96%, calculated using formula I.

Example 11

An aqueous solution of 0.2 M 5-aminouracil and 0.4 M sodium hydroxide (NaOH) was prepared as a cleaning agent for purifying nitrogen-oxide-containing gases. The pH of the aqueous solution was 13.2 and the oxidation-reduction potential (ORP) was −325 mV with pH meter and ORP analyzer individually. Next, the nitrogen-oxide-containing gases were passed through the cleaning agent and analyzed with a gas detector. The purification rate of nitrogen dioxide was 100%, calculated using formula I.

Example 12

An aqueous solution of 0.2 M 3,4-diaminobenzoic acid and 0.2 M sodium hydroxide (NaOH) was prepared as a cleaning agent for purifying nitrogen-oxide-containing gases. The pH of the aqueous solution was 6.6 and the oxidation-reduction potential (ORP) was 35 mV with pH meter and ORP analyzer individually. Next, the nitrogen-oxide-containing gases were passed through the cleaning agent and analyzed with a gas detector. The purification rate of nitrogen dioxide was 98%, calculated using formula I.

Example 13

An aqueous solution of 0.2 M 3,4-diaminobenzoic acid and 0.4 M sodium hydroxide (NaOH) was prepared as a cleaning agent for purifying nitrogen-oxide-containing gases. The pH of the aqueous solution was 13.5 and the oxidation-reduction potential (ORP) was −231 mV with pH meter and ORP analyzer individually. Next, the nitrogen-oxide-containing gases were passed through the cleaning agent and analyzed with a gas detector. The purification rate of nitrogen dioxide was 99%, calculated using formula I.

COMPARATIVE EXAMPLE

Comparative Example 1

An aqueous solution of 0.2 M ascorbic acid ($C_6H_8O_6$) was prepared as a cleaning agent for purifying nitrogen-oxide-containing gases. The pH of the aqueous solution was 2.3 and the oxidation-reduction potential (ORP) was 139 mV with pH meter and ORP analyzer individually. Next, the nitrogen-oxide-containing gases were passed through the cleaning agent and analyzed with a gas detector. The nitrogen-oxide-containing gases purifying rate was calculated to be 9%, and the purification rate of nitrogen dioxide was 80%, calculated using formula I.

Comparative Example 2

An aqueous solution of 0.5 M gallic acid ($C_7H_6O_5$) was prepared as a cleaning agent for purifying nitrogen-oxide-containing gases. The pH of the aqueous solution was 2.9 and the oxidation-reduction potential (ORP) was 210 mV with pH meter and ORP analyzer individually. The nitrogen-oxide-containing gases were passed through the cleaning agent and analyzed with a gas detector. The nitrogen-oxide-containing gases purifying rate was calculated to be 20%, and the purification rate of nitrogen dioxide was 51%, calculated using formula I.

Comparative Example 3

An aqueous solution of 0.2 M 3,4-diaminobenzoic acid was prepared as a cleaning agent for purifying nitrogen-oxide-containing gases. The pH of the aqueous solution was 3.5 and the oxidation-reduction potential (ORP) was 178 mV with pH meter and ORP analyzer individually. The nitrogen-oxide-containing gases were passed through the cleaning agent and analyzed with a gas detector. The purification rate of nitrogen dioxide was 74%, calculated using formula I.

Comparative Example 4

Purified water was prepared as a cleaning agent for purifying nitrogen-oxide-containing gases. The pH of the aqueous solution was 7.6 and the oxidation-reduction potential (ORP) was 283 mV with pH meter and ORP analyzer individually. The nitrogen-oxide-containing gases were passed through the cleaning agent and analyzed with a gas detector. The purification rate of nitrogen dioxide was 16%, calculated using formula I.

Comparative Example 5

An aqueous solution of 0.2 M sodium hydroxide (NaOH) was prepared as a cleaning agent for purifying nitrogen-oxide-containing gases. The pH of the aqueous solution was 13.7 and the oxidation-reduction potential (ORP) was −183 mV with pH meter and ORP analyzer individually. The nitrogen-oxide-containing gases were passed through the cleaning agent and analyzed with a gas detector. The purification rate of nitrogen dioxide was 27%, calculated using formula I.

Comparative Example 6

An aqueous solution of 0.2 M sodium thiosulfate ($Na_2S_2O_3$) was prepared as a cleaning agent for purifying nitrogen-oxide-containing gases. The pH of the aqueous solution was 6.8 and the oxidation-reduction potential (ORP) was −34 mV with pH meter and ORP analyzer individually. The nitrogen-oxide-containing gases were passed through the cleaning agent and analyzed with a gas detector. The purification rate of nitrogen dioxide was 44%, calculated using formula I.

Comparative Example 7

An aqueous solution of 0.2 M sodium thiosulfate ($Na_2S_2O_3$) and 0.2 M sodium hydroxide was prepared as a cleaning agent for purifying nitrogen-oxide-containing gases. The pH of the aqueous solution was 13.1 and the oxidation-reduction potential (ORP) was −137 mV with pH meter and ORP analyzer individually. The nitrogen-oxide-containing gases were passed through the cleaning agent and analyzed with a gas detector. The purification rate of nitrogen dioxide was 51%, calculated using formula I.

Comparative Example 8

An aqueous solution of 0.2 M citric acid was prepared as a cleaning agent for purifying nitrogen-oxide-containing gases. The pH of the aqueous solution was 1.9 and the oxidation-reduction potential (ORP) was 333 mV with pH meter and ORP analyzer individually. The nitrogen-oxide-containing gases were passed through the cleaning agent and analyzed with a gas detector. The purification rate of nitrogen dioxide was 21%, calculated using formula I.

Comparative Example 9

An aqueous solution of 0.2 M citric acid and 0.4 M sodium hydroxide was prepared as a cleaning agent for purifying nitrogen-oxide-containing gases. The pH of the aqueous solution was 4.8 and the oxidation-reduction potential (ORP) was 260 mV with pH meter and ORP analyzer individually. The nitrogen-oxide-containing gases were passed through the cleaning agent and analyzed with a gas detector. The purification rate of nitrogen dioxide was 21%, calculated using formula I.

Comparative Example 10

An aqueous solution of 0.2 M citric acid and 1.0 M sodium hydroxide was prepared as a cleaning agent for purifying nitrogen-oxide-containing gases. The pH of the aqueous solution was 13.3 and the oxidation-reduction potential (ORP) was −118 mV with pH meter and ORP analyzer individually. The nitrogen-oxide-containing gases were passed through the cleaning agent and analyzed with a gas detector. The purification rate of nitrogen dioxide was 44%, calculated using formula I.

Comparative Example 11

An aqueous solution of 0.2 M glycerol was prepared as a cleaning agent for purifying nitrogen-oxide-containing gases. The pH of the aqueous solution was 5.8 and the oxidation-reduction potential (ORP) was 272 mV with pH meter and ORP analyzer individually. The nitrogen-oxide-containing gases were passed through the cleaning agent and analyzed with a gas detector. The purification rate of nitrogen dioxide was 17%, calculated using formula I.

Comparative Example 12

An aqueous solution of 0.2 M glycerol and 0.4 M sodium hydroxide was prepared as a cleaning agent for purifying nitrogen-oxide-containing gases. The pH of the aqueous solution was 13.4 and the oxidation-reduction potential (ORP) was −184 mV with pH meter and ORP analyzer individually. The nitrogen-oxide-containing gases were passed through the cleaning agent and analyzed with a gas detector. The purification rate of nitrogen dioxide was 26%, calculated using formula I.

Comparative Example 13

An aqueous solution of 0.2 M tartaric acid was prepared as a cleaning agent for purifying nitrogen-oxide-containing gases. The pH of the aqueous solution was 1.7 and the oxidation-reduction potential (ORP) was 365 mV with pH meter and ORP analyzer individually. The nitrogen-oxide-containing gases were passed through the cleaning agent and analyzed with a gas detector. The purification rate of nitrogen dioxide was 25%, calculated using formula I.

Comparative Example 14

An aqueous solution of 0.2 M tartaric acid and 0.4 M sodium hydroxide was prepared as a cleaning agent for purifying nitrogen-oxide-containing gases. The pH of the aqueous solution was 5.28 and the oxidation-reduction potential (ORP) was 202 mV with pH meter and ORP analyzer individually. The nitrogen-oxide-containing gases were passed through the cleaning agent and analyzed with a gas detector. The purification rate of nitrogen dioxide was 8%, calculated using formula I.

Comparative Example 15

An aqueous solution of 0.2 M tartaric acid and 0.5 M sodium hydroxide was prepared as a cleaning agent for purifying nitrogen-oxide-containing gases. The pH of the aqueous solution was 12.82 and the oxidation-reduction potential (ORP) was −110 mV with pH meter and ORP analyzer individually. The nitrogen-oxide-containing gases were passed through the cleaning agent and analyzed with a gas detector. The purification rate of nitrogen dioxide was 27%, calculated using formula I

Comparative Example 16

An aqueous solution of 0.2 M oxalic acid was prepared as a cleaning agent for purifying nitrogen-oxide-containing gases. The pH of the aqueous solution was 1 and the oxidation-reduction potential (ORP) was 352 mV with pH meter and ORP analyzer individually. The nitrogen-oxide-containing gases were passed through the cleaning agent and analyzed with a gas detector. The purification rate of nitrogen dioxide was 13%, calculated using formula I.

Comparative Example 17

An aqueous solution of 0.2 M oxalic acid and 0.4 M sodium hydroxide was prepared as a cleaning agent for purifying nitrogen-oxide-containing gases. The pH of the aqueous solution was 5.7 and the oxidation-reduction potential (ORP) was 175 mV with pH meter and ORP analyzer individually. The nitrogen-oxide-containing gases were passed through the cleaning agent and analyzed with a gas detector. The purification rate of nitrogen dioxide was 7%, calculated using formula I.

Comparative Example 18

An aqueous solution of 0.2 M oxalic acid and 0.5 M sodium hydroxide was prepared as a cleaning agent for purifying nitrogen-oxide-containing gases. The pH of the aqueous solution was 12.81 and the oxidation-reduction potential (ORP) was −86 mV with pH meter and ORP analyzer individually. The nitrogen-oxide-containing gases were passed through the cleaning agent and analyzed with a gas detector. The purification rate of nitrogen dioxide was 24%, calculated using formula I In order to illustrate the present disclosure, the aforementioned examples and comparative examples are summarized in Table 1 and Table 2.

As shown in Table 1, according to the results of the examples, the organic acids in the composition for purifying nitrogen-oxide-containing gases, which have enediol group

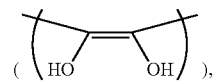

enediamine group

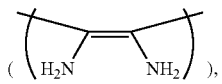

or amine group

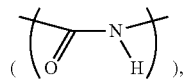

had a great effect in the purification of nitrogen-oxide-containing gases, especially when purifying nitrogen dioxide. If the cleaning agent doesn't contain any alkali substances, it is formed of organic acids such as an organic acid with enediol group, and the purification rate is 80%, which is superior to that of using the organic acid shown in Table 2 as the cleaning agent.

As shown in Table 1, adjusting the pH of the organic acid cleaning agent to 5-14 can greatly enhance the nitrogen dioxide purification rate, even up to 100%.

Referring to comparative example 1 and examples 2 to 4, comparative example 2 and examples 6 to 7, and comparative example 3 and examples 12 to 13, The nitrogen dioxide purifying rate is greatly reduced when the alkaline substance is not added to the composition for purifying nitrogen-oxide-containing gases.

As shown in Table 1 and example 2 to example 13, the composition for purifying nitrogen-oxide-containing gases in the present disclosure has an oxidation-reduction potential of −600 to 40 mV.

TABLE 1

| | organic acid group | composition for purifying nitrogen-oxide-containing gases | concentration of $NO_2$ (ppm) before purifying | concentration of $NO_2$ (ppm) after purifying | purification rate of $NO_2$ | pH | ORP (mV) |
|---|---|---|---|---|---|---|---|
| comparative example 1 | enediol | 0.2M Ascorbic acid | 196 | 40 | 80% | 2.3 | 139 |
| example 2 | | 0.2M Ascorbic acid + 0.2M NaOH | 196 | 2 | 99% | 5.6 | −107 |
| example 3 | | 0.2M Ascorbic acid + 0.4M NaOH | 196 | 1 | 99% | 12.2 | −516 |
| example 4 | | 0.01M Ascorbic acid + 0.04M NaOH | 103 | 0 | 100% | 12.3 | −400 |
| example 5 | | 3M Ascorbic acid + 3M NaOH | 116 | 0 | 100% | 5.9 | −509 |
| comparative example 2 | | 0.2M Gallic Acid | 196 | 135 | 51% | 2.9 | 210 |
| example 6 | | 0.2M Gallic Acid + 0.2M NaOH | 196 | 3 | 98% | 8.8 | −156 |
| example 7 | | 0.2M Gallic Acid + 0.4M NaOH | 196 | 1 | 99% | 10.7 | −215 |
| example 8 | | 0.015M Croconic acid + 0.2M NaOH | 144 | 17 | 88% | 13.1 | −160 |
| example 9 | | 0.015M Croconic acid + 0.4M NaOH | 144 | 13 | 91% | 13.4 | −220 |
| example 10 | amide | 0.2M 5-Aminouracil + 0.2M NaOH | 144 | 6 | 96% | 11 | −161 |
| example 11 | | 0.2M 5-Aminouracil + 0.4M NaOH | 144 | 0 | 100% | 13.2 | −325 |
| comparative example 3 | enediamine | 0.2M 3,4-Diaminobenzoic acid | 144 | 37 | 74% | 3.5 | 178 |
| example 12 | | 0.2M 3,4-Diaminobenzoic acid + 0.2M NaOH | 144 | 3 | 98% | 6.6 | 35 |
| example 13 | | 0.2M 3,4-Diaminobenzoic acid + 0.4M NaOH | 144 | 2 | 99% | 13.5 | −231 |

As shown in Table 2 and comparative example 1-15, The organic acid functional groups of the cleaning agent are also important factors, even if the cleaning agent has a pH of 5-14, or has an oxidation-reduction potential of −600 to 40 mV.

TABLE 2

| | functional group | composition for purifying nitrogen-oxide-containing gases | concentration of $NO_2$ (ppm) before purifying | concentration of $NO_2$ (ppm) after purifying | purification rate of $NO_2$ | pH | ORP (mV) |
|---|---|---|---|---|---|---|---|
| comparative example 4 | $OH^-$ | pure water | 196 | 164 | 16% | 7.6 | 283 |
| comparative example 5 | | 0.2M NaOH | 196 | 144 | 27% | 13.7 | −183 |
| comparative example 6 | $S_2O_3^{2-}$ | 0.2M $Na_2S_2O_3$ | 196 | 109 | 44% | 6.8 | −34 |
| comparative example 7 | | 0.2M $Na_2S_2O_3$ + 0.2M NaOH | 196 | 95 | 51% | 13.1 | −137 |
| comparative example 8 | —OH | 0.2M Citric Acid | 196 | 155 | 21% | 1.9 | 333 |
| comparative example 9 | | 0.2M Citric Acid + 0.4M NaOH | 196 | 155 | 21% | 4.8 | 260 |
| comparative example 10 | | 0.2M Citric Acid + 1.0M NaOH | 196 | 109 | 44% | 13.3 | −118 |
| comparative example 11 | —OH | 0.2M Glycerol | 144 | 119 | 17% | 5.8 | 272 |
| comparative example 12 | | 0.2M Glycerol + 0.4M NaOH | 144 | 107 | 26% | 13.4 | −184 |
| comparative example 13 | —OH | 0.2M Tartaric acid | 144 | 108 | 25% | 1.7 | 365 |
| comparative example 14 | | 0.2M Tartaric acid + 0.4M NaOH | 144 | 132 | 8% | 5.28 | 202 |
| comparative example 15 | | 0.2M Tartaic acid + 0.5M NaOH | 112 | 82 | 27% | 12.82 | −110 |
| comparative example 16 | —COOH | 0.2M Oxalic acid | 144 | 126 | 13% | 1 | 352 |
| comparative example 17 | | 0.2M Oxalic acid + 0.4M NaOH | 144 | 134 | 7% | 5.7 | 175 |
| comparative example 18 | | 0.2M Oxalic acid + 0.5M NaOH | 114 | 87 | 24% | 12.81 | −86 |

Accordingly, the composition for purifying nitrogen-oxide-containing gases disclosed in the present disclosure has an extremely large purifying effect as indicated by the examples and comparative examples.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A composition for purification of nitrogen-oxide-containing gases, comprising:
an alkaline substance; and
at least one organic acid, wherein the at least one organic acid comprises 3,4-diaminobenzoic acid, gallic acid, croconic acid, 1,2-dihydroxy-3-one cyclopentene, hydroxymalonaldehyde, or 5-aminouracil, or a cyclopentene compound having an enediamine group

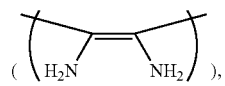

a cyclohexene compound having an enediamine group, a cycloheptene compound having an enediamine group, a fused ring compound having an enediamine group or a phenanthrene compound having an enediamine group.

2. The composition for purification of nitrogen-oxide-containing gases as claimed in claim 1, wherein the alkaline substance has a concentration of 0.01-3.0M.

3. The composition for purification of nitrogen-oxide-containing gases as claimed in claim 1, wherein the organic acid has a concentration of 0.01-3.0M.

4. The composition for purification of nitrogen-oxide-containing gases as claimed in claim 1, wherein the alkaline substance comprises sodium hydroxide, potassium hydroxide, calcium hydroxide, or a combination thereof.

5. The composition for purification of nitrogen-oxide-containing gases as claimed in claim 1, wherein the composition has a pH of 5-14.

6. The composition for purification of nitrogen-oxide-containing gases as claimed in claim 1, wherein the composition has an oxidation-reduction potential of −600 to 40 mV.

7. A device for purification of nitrogen-oxide-containing gases, comprising:
a conversion module for converting nitric oxide to nitrogen dioxide; and
a purification tank connected to the conversion module to serve as a reservoir for the composition as claimed in claim 1.

8. The device for purification of nitrogen-oxide-containing gases as claimed in claim 7, wherein the conversion module is equipped with a palladium (Pd)-based oxide, a platinum (Pt)-type oxide, a rhodium-based oxide, a lanthanum (La)-based oxide, or a combination thereof.

* * * * *